US008656094B2

(12) United States Patent
Peake

(10) Patent No.: US 8,656,094 B2
(45) Date of Patent: Feb. 18, 2014

(54) LOCATING HOST DATA RECORDS ON A PHYSICAL STACKED VOLUME

(75) Inventor: Jonathan W. Peake, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 12/775,421

(22) Filed: May 6, 2010

(65) Prior Publication Data

US 2011/0276753 A1 Nov. 10, 2011

(51) Int. Cl.
*G06F 12/06* (2006.01)

(52) U.S. Cl.
USPC ............... 711/111; 711/6; 711/202; 711/203

(58) Field of Classification Search
USPC ..................... 711/4, 111, 202, 203
See application file for complete search history.

(56) References Cited

U.S. PATENT DOCUMENTS

| | | | | |
|---|---|---|---|---|
| 5,546,557 A * | 8/1996 | Allen et al. | ............... | 711/111 |
| 5,608,875 A * | 3/1997 | Mori | ............... | 711/4 |
| 6,173,359 B1 * | 1/2001 | Carlson et al. | ............... | 711/111 |
| 6,467,021 B1 | 10/2002 | Sinclair | ............... | 711/113 |
| 6,625,704 B2 * | 9/2003 | Winokur | ............... | 711/162 |
| 6,708,265 B1 | 3/2004 | Black | ............... | 711/207 |
| 6,816,941 B1 * | 11/2004 | Carlson et al. | ............... | 711/111 |
| 6,912,548 B1 | 6/2005 | Black | ............... | 707/200 |
| 7,107,417 B2 | 9/2006 | Gibble et al. | ............... | 711/161 |
| 7,428,604 B2 | 9/2008 | Black | ............... | 710/31 |
| 7,437,492 B2 * | 10/2008 | Stager et al. | ............... | 710/68 |
| 7,603,530 B1 | 10/2009 | Liikanen et al. | ............... | 711/162 |
| 8,533,427 B2 | 9/2013 | Bish et al. | | |
| 2002/0035664 A1 * | 3/2002 | Yates et al. | ............... | 711/111 |
| 2007/0055831 A1 * | 3/2007 | Beeston et al. | ............... | 711/154 |
| 2008/0172542 A1 | 7/2008 | Kaushik | ............... | 711/202 |
| 2008/0250197 A1 | 10/2008 | Daily et al. | | |
| 2009/0083501 A1 | 3/2009 | Friauf et al. | | |
| 2009/0204759 A1 | 8/2009 | Seaman et al. | | |
| 2009/0248974 A1 | 10/2009 | Bello et al. | ............... | 711/111 |
| 2010/0057844 A1 | 3/2010 | Johnson | | |
| 2010/0103549 A1 * | 4/2010 | Murayama et al. | ............... | 360/15 |
| 2010/0306500 A1 | 12/2010 | Mimatsu | | |
| 2012/0239876 A1 | 9/2012 | Bish et al. | | |
| 2012/0239877 A1 | 9/2012 | Peake | | |

OTHER PUBLICATIONS

Zhang, Xianbo, et al. "Hptfs: A high performance tape file system." Proceedings of 14th NASA Goddard/23rd IEEE conference on Mass Storage System and Technologies. 2006.*

(Continued)

*Primary Examiner* — Sanjiv Shah
*Assistant Examiner* — Samuel Dillon
(74) *Attorney, Agent, or Firm* — Zilka-Kotab, PC

(57) ABSTRACT

According to one embodiment, a computer program product includes a computer readable storage medium having computer readable program code embodied therewith, the computer readable program code comprising: computer readable program code configured to receive a mount request to access at least one host data record on a virtual tape storage (VTS) system; computer readable program code configured to determine a number of host compressed data records per physical block on a magnetic tape medium; computer readable program code configured to determine a physical block ID (PBID) that corresponds to the requested at least one host data record; computer readable program code configured to access a physical block on the magnetic tape medium corresponding to the PBID; and computer readable program code configured to output the physical block without outputting an entire logical volume from the magnetic tape medium that the physical block is stored to. Other systems and computer program products are also described.

20 Claims, 7 Drawing Sheets

(56) References Cited

OTHER PUBLICATIONS

Feng, Dan, et al. "TLFS: High performance tape library file system for data backup and archive." Proceedings of 7th International Meeting on High Performance Computing for Computational Science. Rio de Janeiro, Brazil: Springer. 2006.*

Bradshaw, Richard, and Carl Schroeder. "Fifty years of IBM innovation with information storage on magnetic tape." IBM Journal of Research and Development 47.4 (2003): 373-383.*

Hughes, James, Charles Milligan, and Jacques Debiez. "High performance RAIT." NASA Conference Publication. NASA; 1998, 2002.*

U.S. Appl. No. 12/775,425, filed May 6, 2010.

U.S. Appl. No. 12/775,413, filed May 6, 2010.

Sang Su Nam et al., "A hybrid mapping technique for logical volume manager in SAN environments" Korea Inf. Sci. Soc. Journal of KISS: Computing Practices, vol. 10, No. 1, p. 99-113, Feb. 2004.

Sukwoo Kang et al., "An Approach to Virtual Allocation in Storage Systems" ACM Transactions on Storage, vol. 2, No. 4, Nov. 2006, pp. 371-399.

"SAE—Stand Alone Restore" NewEra Software, Inc., Software for Image Management & System Recovery.

Non-Final Office Action Summary from U.S. Appl. No. 13/484,142 dated Jun. 21, 2012.

U.S. Appl. No. 13/484,142, filed May 30, 2012.

Notice of Allowance and Fee(s) Due from U.S. Appl. No. 12/775,413 dated Apr. 24, 2013.

Final Office Action from U.S. Appl. No. 13/484,133 dated Jun. 17, 2013.

Non-Final Office Action from U.S. Appl. No. 12/775,425 dated Mar. 19, 2013.

Restriction/Election Requirement from U.S. Appl. No. 12/775,413 dated Dec. 7, 2012.

Non-Final Office Action from U.S. Appl. No. 12/775,413 dated Jan. 2, 2013.

Non-Final Office Action from U.S. Appl. No. 13/484,133 dated Dec. 11, 2012.

Final Office Action from U.S. Appl. No. 13/484,142 dated Jan. 4, 2013.

Non-Final Office Action from U.S. Appl. No. 12/775,425 dated Oct. 18, 2013.

Non-Final Office Action from U.S. Appl. No. 13/484,142 dated Oct. 1, 2013.

* cited by examiner

Virtual Volume 200

| Volume Header 210 | Host Data Record 1  220 | Host Data Record 2  220 | • • • | Host Data Record J  220 |
|---|---|---|---|---|

FIG. 2

Volume Header 210

| Volume ID 212 | Volume Length 214 | Volume Control Flags  216 |
|---|---|---|
|  |  | Partial Volume 218 |

FIG. 3

Host Data Record 220

| Block ID 222 | Record Length 224 | Compressed Host Data 226 |
|---|---|---|

FIG. 4

Host Mount Request 400

| VOLSER 410 | New Flag 420 | Start Block ID 430 | Block Count 440 | Block Size 450 |
|---|---|---|---|---|

FIG. 8

VOLSER Database Table 68

| VOLSER 510 | Cache Resident Type 520 | Physical Tape VOLSER 530 | Starting Block 540 | Blocks 550 | Last Access Date/Time 560 | Compression Ratio 570 |
|---|---|---|---|---|---|---|
| ABC123 | Resident | Null | Null | Null | 3/3/10 8:24:35 | 2.03 |
| EFG555 | Copied | 123456 | 39005 | 35125 | 3/1/10 17:38:12 | 3.14 |
| JKL777 | No | 545454 | 84278 | 39748 | 1/25/10 14:56:01 | 4.25 |
| XYZ999 | Partial | 999999 | 63018 | 39898 | 2/25/10 5:17:47 | 2.77 |

LOCATING HOST DATA RECORDS ON A PHYSICAL STACKED VOLUME

BACKGROUND

There are a plurality of applications on large operating systems, such as mainframe and server operating systems, that place multiple datasets or objects on a tape volume. Examples include, but are not limited to, Data Facility Storage Management System (DFSMS) Hierarchical Storage Manager (HSM), DBMS Object Access Method (OAM) and Tivoli Storage Manager (TSM). HSM and TSM may be used to migrate Direct Access Storage Device (DASD) datasets from one storage device to another, such as from a hard disk drive (HDD) to a tape drive, or to make a copy of a dataset, possibly to create a backup dataset. OAM places object data on a tape volume that may be a backup of data or original data. Typically, these applications access a database in which they keep track of the dataset/object name, the tape volume it was written to, the location on the tape volume of the dataset and/or object, and how many tape records make up the dataset/object.

When one of the migrated or backup datasets is requested by a user, these applications request a mount of the tape volume, and once the mount has completed, the applications instruct the tape drive to position to the location where the records associated with the dataset/object reside, and then read the requested records. This is typically referred to as a recall operation. If there are no other datasets on the tape volume to be recalled, the volume is demounted. The size of the dataset/object being recalled is often less than 250 KB in DFSMS HSM datasets, but may be any size in any system. There are also applications on open system platforms, such as TSM, that work in this way.

In physical tape drives, one of the key functions that is typical of an enterprise class tape drive is the ability to do a high speed locate operation to the beginning of the data to be read. This allows the tape drive to position to the requested data much faster than by just using conventional forward space block and read commands.

For a virtual tape storage (VTS) system that internally employs hierarchical storage, there are several reasons that a significant amount of inefficiency occurs when handling the above described types of application workloads. One of the biggest problems encountered when putting applications with this type of data on a VTS system is the time that occurs while waiting for a recall operation to retrieve the requested data. Currently, if the recall times are not acceptable to the user of the VTS system, native tape drives are added to the overall solution to replace non-native ones, and this can significantly increase the cost of the system to the customer.

Therefore, it would be beneficial to have a system and/or method which could reduce the inefficiencies in accessing data on VTS systems which employ hierarchical storage.

SUMMARY

According to another embodiment, a computer program product includes a computer readable storage medium having computer readable program code embodied therewith. The computer readable program code includes computer readable program code configured to receive a mount request to access at least one host data record on a virtual tape storage (VTS) system, computer readable program code configured to determine a number of host compressed data records per physical block on a magnetic tape medium, computer readable program code configured to determine a physical block ID (PBID) that corresponds to the requested at least one host data record, computer readable program code configured to access a physical block on the magnetic tape medium corresponding to the PBID, and computer readable program code configured to output the physical block without outputting an entire logical volume from the magnetic tape medium that the physical block is stored to.

In yet another embodiment, a virtual tape storage (VTS) system includes random access storage, sequential access storage, support for at least one virtual volume, a storage manager having logic for determining a physical block ID (PBID) that corresponds to a starting logical block ID (SLBID), and logic. The logic includes logic for receiving a mount request to access at least one host data record stored to the sequential access storage, logic for determining a number of host compressed data records per physical block on the sequential access storage, logic for determining a physical block ID (PBID) that corresponds to the requested at least one host data record, logic for accessing a physical block on the sequential access storage corresponding to the PBID, comprising: reading into a tape volume cache a first physical block, and examining the first physical block in the tape volume cache to determine if the requested at least one host data record is present in the tape volume cache; or reading into a tape volume cache at least a predetermined memory size of physical blocks, locating a logical block ID (LBID) corresponding to the requested at least one host data record in the physical blocks, and accessing a host data record that corresponds to the LBID, logic for copying a portion of a logical volume from the sequential access storage to the random access storage without copying the entire logical volume, and logic for storing a last overall compression ratio for each logical volume stored to the sequential access storage medium, wherein the sequential access storage comprises at least one magnetic tape medium.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 2 is a generalized diagram of a virtual volume used to store data in the virtual tape storage system of FIG. 1C, in one embodiment.

FIG. 3 is a generalized diagram of a volume header that is part of a virtual volume of FIG. 2, in one embodiment.

FIG. 4 is a generalized diagram of a host data record that is part of a virtual volume of FIG. 2, according to one embodiment.

FIG. 8 is a generalized diagram of a host mount request used with a virtual tape storage system of FIG. 1C, according to one embodiment.

FIG. 9 is a generalized diagram that shows the contents of the virtual volume database of the virtual tape storage system of FIG. 1C, according to one embodiment.

DETAILED DESCRIPTION

Figure 1A:
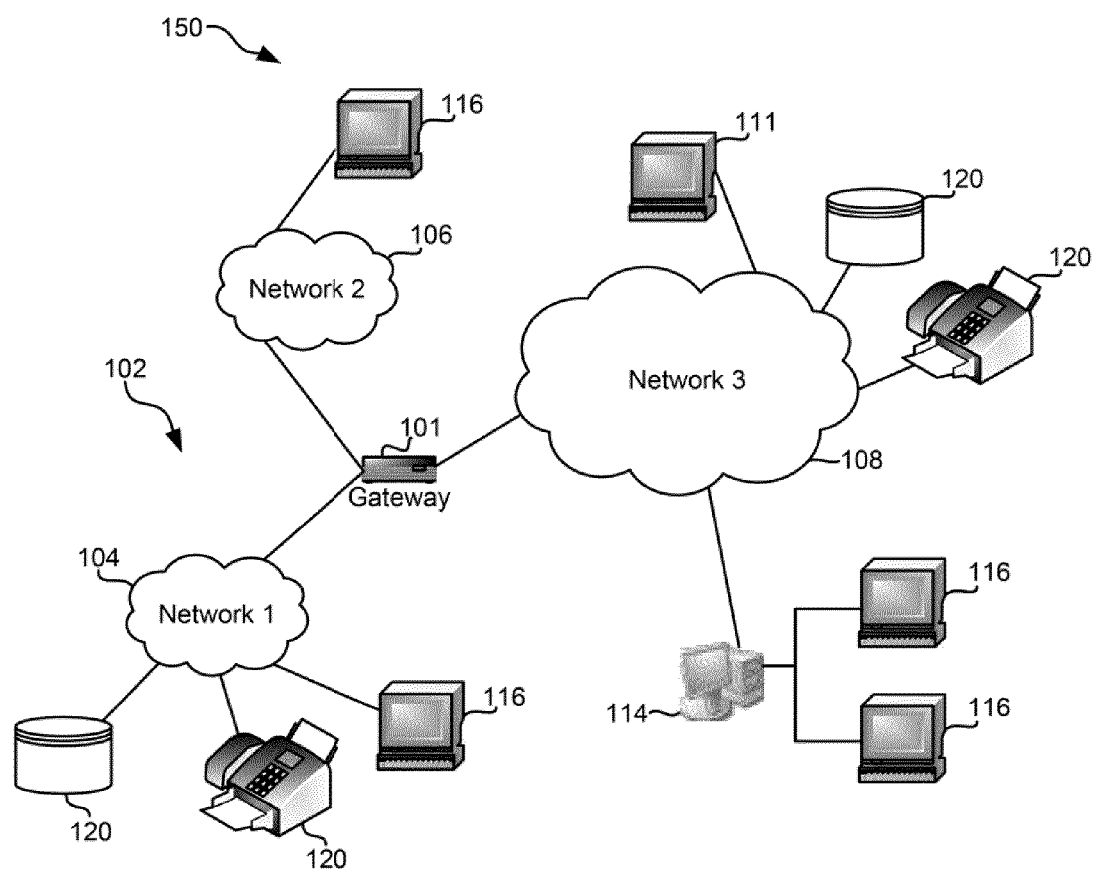
FIG. 1A illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to a preferred embodiment of the present invention, sometimes referred to as partial volume recall, an application's positional information relating to requested data may be used by a virtual tape storage (VTS) system to correlate to a position of the actual physical location (at or before the beginning) of the requested data on a physical stacked tape. In some embodiments, the logical block ID (LBID) provided by the application, a calculation of the blocksize of the requested data, the average compression ratio of the data being written to the virtual volume, and information about the blocking of data in a logical volume may be used to determine a physical block ID (PBID) to send to the physical media drives to position for retrieval of the requested data.

In one general embodiment, a method for accessing host data records stored on a virtual tape storage (VTS) system includes receiving a mount request to access at least one host data record on a VTS system, determining a number of host compressed data records per physical block on a sequential access storage medium, determining a physical block ID (PBID) that corresponds to the requested at least one host data record, accessing a physical block on the sequential access storage medium corresponding to the PBID, and outputting the physical block without outputting an entire logical volume from the sequential access storage medium that the physical block is stored to.

According to another general embodiment, a computer program product includes a computer readable storage medium having computer readable program code embodied therewith. The computer readable program code includes computer readable program code configured to receive a mount request to access at least one host data record on a virtual tape storage (VTS) system, computer readable program code configured to determine a number of host compressed data records per physical block on a magnetic tape medium, computer readable program code configured to determine a physical block ID (PBID) that corresponds to the requested at least one host data record, computer readable program code configured to access a physical block on the magnetic tape medium corresponding to the PBID, and computer readable program code configured to output the physical block without outputting an entire logical volume from the magnetic tape medium that the physical block is stored to.

In yet another general embodiment, a virtual tape storage (VTS) system includes random access storage, sequential access storage, support for at least one virtual volume, a storage manager having logic for determining a physical block ID (PBID) that corresponds to a starting logical block ID (SLBID), and logic. The logic includes logic for receiving a mount request to access at least one host data record stored to the sequential access storage, logic for determining a number of host compressed data records per physical block on the sequential access storage, logic for determining a physical block ID (PBID) that corresponds to the requested at least one host data record, logic for accessing a physical block on the sequential access storage corresponding to the PBID, comprising: reading into a tape volume cache a first physical block, and examining the first physical block in the tape volume cache to determine if the requested at least one host data record is present in the tape volume cache; or reading into a tape volume cache at least a predetermined memory size of physical blocks, locating a logical block ID (LBID) corresponding to the requested at least one host data record in the physical blocks, and accessing a host data record that corresponds to the LBID, logic for copying a portion of a logical volume from the sequential access storage to the random access storage without copying the entire logical volume, and logic for storing a last overall compression ratio for each logical volume stored to the sequential access storage medium, wherein the sequential access storage comprises at least one magnetic tape medium.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A illustrates a network architecture 150, in accordance with one embodiment. As shown in FIG. 1A, a plurality of remote networks 102 are provided including a first remote network 104 and a second remote network 106. A gateway 101 may be coupled between the remote networks 102 and a proximate network 108. In the context of the present network architecture 150, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 1B:
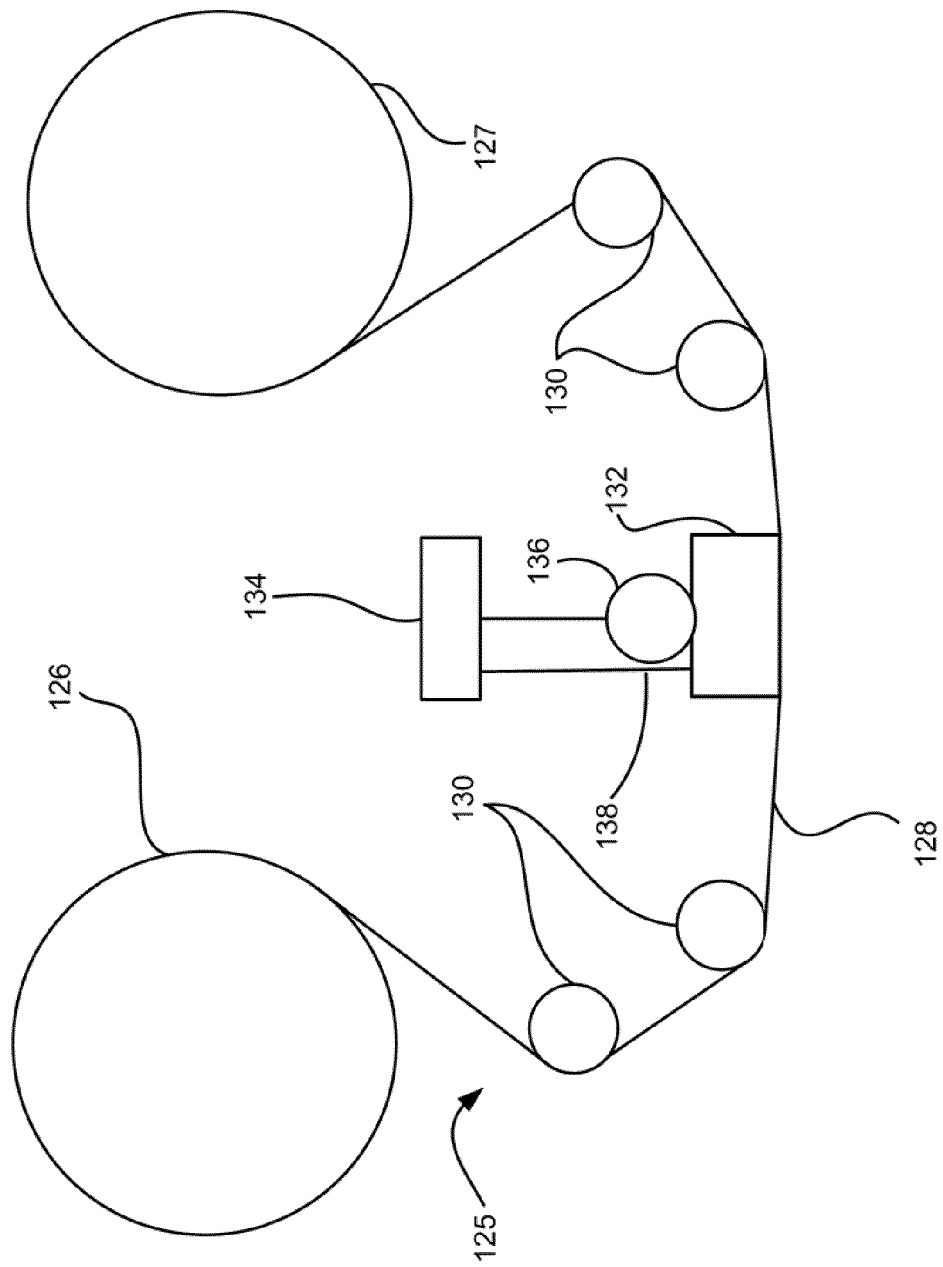
FIG. 1B is a schematic of tape drive system, in accordance with one embodiment.

FIG. 1B is a schematic diagram of a simplified tape drive system 125, in accordance with one embodiment, which may be a standalone unit, part of a tape library system, a peripheral 120 of FIG. 1A, etc. Such a tape drive may be employed in the context of an embodiment of the present invention. While one specific implementation of a tape drive 125 is shown in FIG. 1B, it should be noted that the embodiments of the previous figures may be implemented in the context of any type of tape drive system.

As shown, a tape supply cartridge 126 and a take-up reel 127 are provided to support a tape 128. These may form part of a removable cassette and are not necessarily part of the system. Guides 130 guide the tape 128 across a preferably bidirectional tape head 132. Such tape head 132 may be a MR, GMR, TMR, spin-valve, or other type. Tape head 132 is in turn coupled to a controller assembly 134 via a connector cable 138. The controller 134, in turn, controls head functions such as servo following, write bursts, read functions, etc. An actuator 136 controls position of the head 132 relative to the tape 128.

A tape drive, such as that illustrated in FIG. 1B, includes drive motor(s) to drive the tape supply cartridge 126 and the take-up reel 127 to move the tape 128 linearly over the head 132. The tape drive also includes a read/write channel to transmit data to the head 132 to be recorded on the tape 128 and to receive data read by the head 132 from the tape 128. An interface is also provided for communication between the tape drive and a host (integral or external) to send and receive the data and for controlling the operation of the tape drive and communicating the status of the tape drive to the host, all as will be understood by those of skill in the art.

Figure 1C:
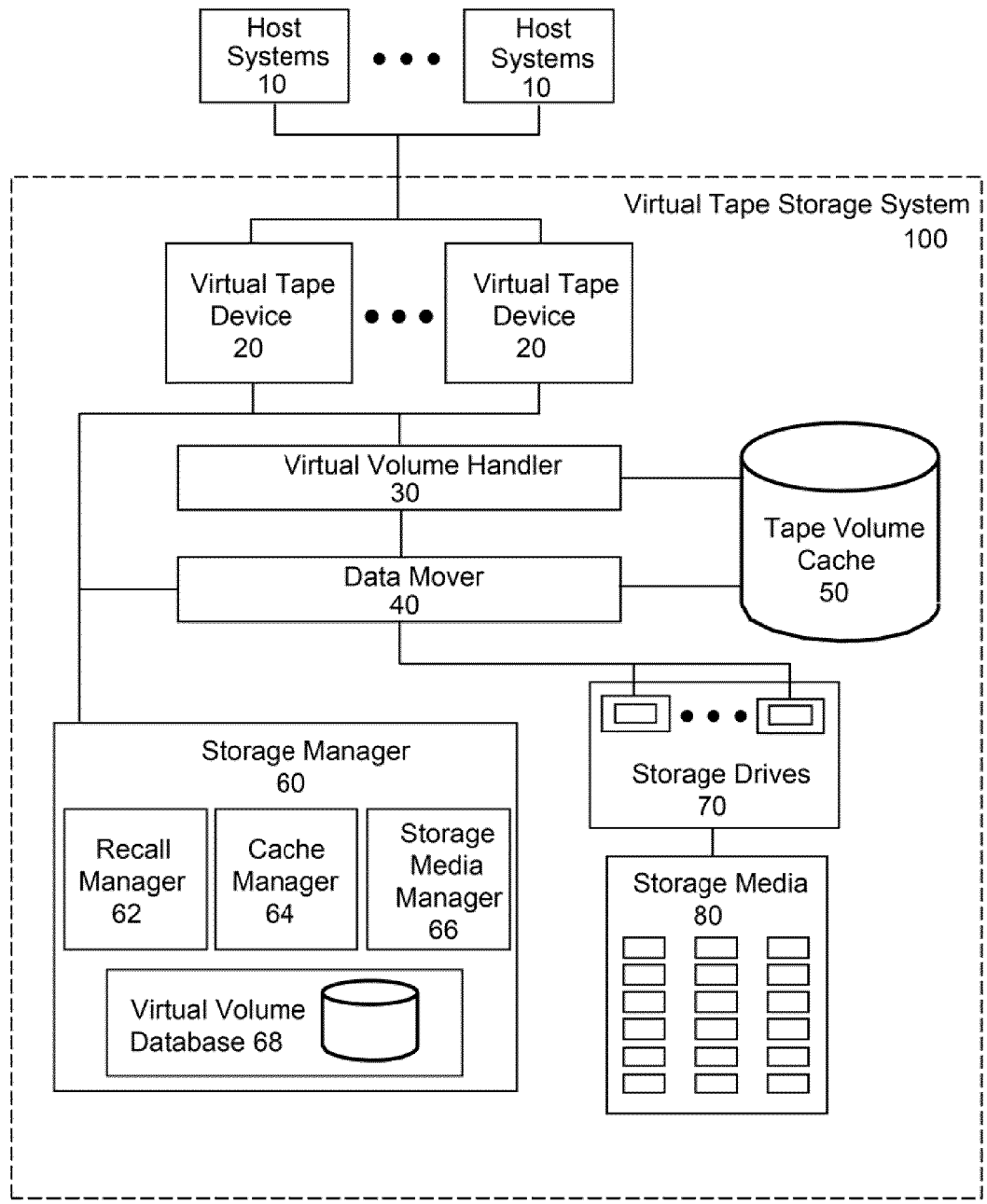
FIG. 1C is a block diagram showing an interconnection of functional components of a virtual tape storage system for partially recalling host-originated virtual volumes from physical tape storage to cache storage, in accordance with one embodiment.

Referring now to FIG. 1C, a block diagram of a virtual tape storage (VTS) system 100, for example an IBM TS7700 Virtual Tape Storage System, is shown coupled to a plurality of host systems 10. Application programs running within any host system 10 generate data to be stored within the VTS system 100. The host system 10 may be embodied by a variety of types and numbers of processing units, such as a mainframe computer, a personal computer, a server, a workstation, etc. The application programs may be of any number of types, including, but not limited to, hierarchical storage, data backup/recovery, master data file processing, etc.

Applications particularly well suited to utilize some embodiments of the methods and systems described herein are hierarchical storage applications, such as IBM Data Facility Storage Management System (DFSMS) Hierarchical Storage Manager (HSM), IBM Tivoli Storage Manager, etc. How these applications utilize tape storage is known in the art. The VTS system 100 includes a plurality of virtual tape devices 20 interconnected to the host system 10 and a virtual volume handler 30. The virtual volume handler 30 is coupled to the tape volume cache 50. A data mover 40 is also coupled to the tape volume cache 50 and a plurality of storage drives 70. Also, included in the VTS system 100 is a plurality of storage media 80. The storage media 80 may comprise a variety of types of sequential storage media, such as magnetic tape, optical disk, etc. The storage drives 70 may also include magnetic tape drives, optical drives, etc. Storage media 80 is moved to/from storage drives 70 by mechanical means (such as an automated tape system, not shown). The storage manager 60 is also coupled to the host system 10 through the virtual tape devices 20 as well as to all other elements of the VTS system 100. The storage manager 60 is comprised of at least one recall manager 62, at least one cache manager 64, at least one storage media manager 66 and at least one virtual volume database 68. The storage manager 60 may comprise a digital processing apparatus such as a microprocessor, personal computer, a more advanced processing machine, etc. The number of virtual volumes (e.g., volume 200 of FIG. 2) included in a VTS system 100 may number in the hundreds to the tens of thousands to many millions. Information about each of the virtual volumes 200 included in the VTS system 100 is kept in the virtual volume database 68 by the storage manager 60. The storage for the virtual volume database 68 is typically disk, but other non-volatile storage technologies, such as flash, RAM, etc., may be employed.

FIG. 2 is a representation of a virtual volume 200 used in a virtual tape storage (VTS) system (e.g., VTS system 100 of FIG. 1C) to store host system application data, according to one embodiment. A virtual volume 200 includes a volume header 210 and "J" host data records 220, in some approaches. Within a VTS system, there are a plurality of virtual volumes 200, each identified by a unique volume identifier, typically called a volume serial number (VOLSER). A plurality of virtual volumes 200 may be stored in the tape volume cache and managed by the storage manager, in some approaches.

FIG. 3 is a representation of a volume header 210, in one embodiment, that may be part of a virtual volume (e.g., volume 200 of FIG. 2). The volume header 210 may be made up of several elements and may be used by the storage manager and/or the virtual volume handler in managing a virtual volume, according to preferred embodiments. The elements may comprise a volume ID 212 which includes the unique volume identifier (VOLSER) for the virtual volume, a volume length 214 which includes a value that represents the overall number of bytes stored in the virtual volume, and a set of volume control flags 216. The volume control flags 216 may include many pieces of information useful in the management of a virtual volume, however, in accordance with some embodiments, only a single control flag, partial volume 218 is described.

With reference to FIGS. 1C, 2, and 4, FIG. 4 is a representation of a host data record 220 that may be part of a virtual volume 200, in one embodiment. A host data record 220 may be made up of several elements and may be used by the storage manager 60 and the virtual volume handler 30 in managing a virtual volume 200. A host data record 220 may have a variable length, dependent on the host written data record length and the amount of compression the virtual tape device 20 yields for the record. The elements may comprise a block ID 222 which includes a value that is incremented for every host written data block, a record length 224 which includes a value that represents the overall number of bytes of the last element, which may be compressed host data 224 which includes the post compressed data written by a host system 10.

Figure 5:
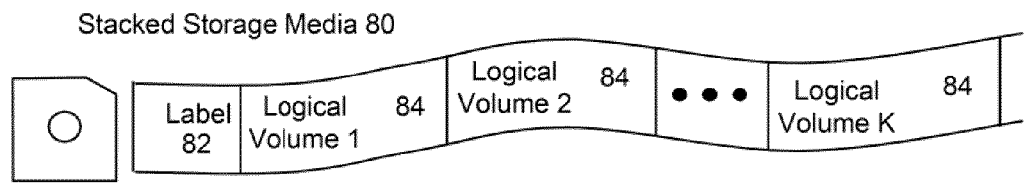
FIG. 5 is a generalized diagram of stacked logical volumes stored on a single physical storage media volume for use in the virtual tape storage system of FIG. 1C, according to one embodiment.

FIG. 5 is a representation of a stacked storage media 80 physical tape volume that includes a label 82 and a plurality of logical volumes 84, according to one embodiment. The label 82 is typically a standard set of tape records that identifies the volume serial number (VOLSER) of the physical volume, its recording format, and other information, such as ownership. The label 82, in some embodiments, may be of a type well known in the art, such as an IBM Standard Tape Label or an ANSI Standard Volume Label. Referring to FIGS. 1C, 2, and 5, a logical volume 84 may be a copy of or derived from a virtual volume 200 from the tape volume cache 50 written by an independent drive and added to the VTS system 100, written directly from a host system 10 to a drive of the VTS system 100, etc. Logical volumes 84 may be placed end to end on the storage media 80 and are commonly referred to as being "stacked" on the media.

Figure 6:
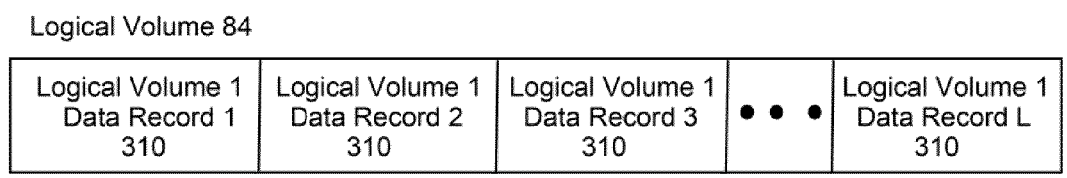
FIG. 6 is a generalized diagram of a logical volume stored on a single physical storage media volume for use in the virtual tape storage system of FIG. 1C, according to one embodiment.

With reference to FIGS. 5 and 6, in FIG. 5 a representation of a logical volume 84 that has been copied to storage media 80 is shown according to one approach. A logical volume 84 includes a plurality of logical volume data records 310, each corresponding to a physical block on the storage media 80, the number depending on the amount of data stored on the virtual volume 200 the logical volume 84 is a copy of, in one embodiment. In this described embodiment, the length of the logical volume data record 310 may be fixed at 256 KB (261,784 bytes). Alternative embodiments are possible using different fixed logical volume data record 310 sizes, such as 128 KB, 512 KB, 1 MB, etc. Data from a virtual volume 200 may be segmented to fit into that record size as described later. The physical block that contains logical volume data record 310 may be assigned a physical block ID (PBID) as it is written to the storage media 80, or at some other time as is convenient in the processing of the storage media (for example, several block IDs may be written in a single operation). The storage drive 70 may use the block ID in a subsequent search operation to quickly position the storage media 80 at a requested block ID. This search capability is well known as employed in many tape storage drives, such as the IBM 3592 High Performance Tape System, etc.

Figure 7:
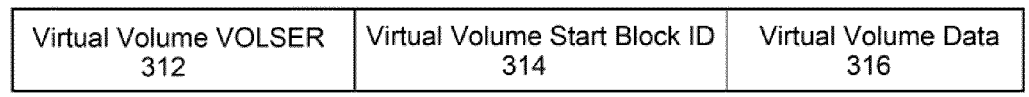
FIG. 7 is a generalized diagram of the logical volume data record that is part of the logical volume of FIG. 6, according to one embodiment.

With reference to FIGS. 1C, 2, 5, and 7, in FIG. 7, a representation of a logical volume data record 310 is shown according to one embodiment. It includes two information fields and a data field. The first information field, virtual volume VOLSER 312, includes the volume serial number of the virtual volume 200. During a recall of a logical volume 84, the virtual volume VOLSER 312 field is used by the recall manager 62 to ensure that the correct virtual volume 200 is being copied back into the tape volume cache 50, in one approach. The second information field, virtual volume start block ID 314, includes the block ID 222 of the host data record 220 that starts at the beginning of the virtual volume data 316 field, in one embodiment. In accordance with one embodiment, the virtual volume start block ID 314 field may be used by the recall manager 62 to ensure that the correct host requested data records will be part of the data recalled into the tape volume cache 50. In this embodiment, the virtual volume VOLSER 312 field may be 6 bytes in length and the virtual volume start block ID 314 field may be 12 bytes in length. This leaves a total of 261,766 bytes for the virtual volume data field 316. Therefore, every logical volume data record 310 includes 261,766 bytes of the virtual volume 200 being copied to the storage media 84. For any virtual volume 200 with a length greater than 261,766 bytes, multiple logical volume data records 310 are used to store the virtual volume 200 on storage media 84, in a preferred embodiment.

With reference to FIGS. 1C, 2, and 8, in FIG. 8, a representation of a host mount request 400 that may be sent from the host system 10 to one of the virtual tape devices 20 in order to access a virtual volume 200 in a VTS system 100 is shown according to one embodiment. Included in the host mount request 400 is the VOLSER 410 field that may be used to pass the volume serial number (VOLSER) of the virtual volume 200 that the host system 10 desires access to, or, in the alternative, if this field includes all blanks, the storage manager 60 may select any available free virtual volume 200 to satisfy the request, in one approach. Also included is a new flag field 420 that indicates that the host system 10 will write the virtual volume 200 from its beginning and any old data associated with the selected volume serial number (VOLSER) can be discarded. The start block ID 430, block count 440 and block size 450 fields of the host mount request 400 may be used by the host system 10 when it requests that an existing virtual volume 200 is to be made accessible and is indicating that only the portion of the volume specified by the three fields is to be recalled into the tape volume cache 50, in one embodiment. Although only one group of these three fields is shown, it should be clear to those skilled in the art of building storage systems that multiple groups may be specified as part of the host mount request 400.

With reference to FIGS. 1C, 2, and 9, in FIG. 9, a representation of a few entries in the virtual volume database 68 for the virtual volumes 200 included in the VTS system 100 and managed by the storage manager 60 are shown according to one embodiment. Entries 501, 502, 503 and 504 are for virtual volumes 200 ABC123, EFG555, JKL777 and XYZ999, respectively. For each entry, the virtual volume database 68 includes a VOLSER 510 field that identifies the volume serial number of the virtual volume 200 associated with the entry, in one approach. Each entry also includes a cache residency 520 field that holds the status of the virtual volume 200 in regard to the tape volume cache 50, in another embodiment.

According to one approach, and not limiting in any way, the cache residency 520 field may include "Resident" if the virtual volume 200 is only included in the tape volume cache 50, it may include "Copied" if the virtual volume 200 is included in the tape volume cache 50 and is on a storage media 80, it may include "No" if the virtual volume 200 is only included on storage media 80, and it may include "Partial" if only a portion of virtual volume 200 is included in the tape volume cache 50.

Now referring to physical tape VOLSER 530, this field may include the volume serial number of the storage media 80 that a virtual volume 200 has been copied to. If the virtual volume 200 has not yet been copied to storage media 80, then this field may include "Null." Starting block 540 may include the physical block. ID (PBID) on storage media 80 that the first segment of virtual volume 200 has been copied to. Blocks 550 may include the total number of blocks (and thus logical volume data records 310) on the storage media 80 used to copy the entire virtual volume 200. The last access/date time 560 field may include a date and time stamp of when the virtual volume 200 was last accessed by a host system 10. In accordance with one embodiment, a compression ratio 570 field may be included that has the ratio of the host system written bytes to the number of bytes stored in a virtual volume 200. For example, a compression ratio 570 value of 2.03, as shown for virtual volume 200 ABC123, indicates that the host system wrote 2.03 times the number of bytes needed to store the volume's data in the tape volume cache 50 due to the compression provided by the virtual tape device 20.

Now, referring back to FIGS. 1C-3 and 8, the virtual tape devices 20 within the VTS system 100 appear to the host system 10 as multiple storage devices, such as 256 IBM 3490 tape storage devices, each with a unique address, in one approach. The hierarchical storage application running on a host system 10 creates a new virtual volume 200 by first having the host system 10 send a host mount request 400 to request that a virtual volume 200 be mounted on one of the virtual tape devices 20. The host mount request 400 indicates that the mount request is for a new volume by setting the new flag 420 to "Yes" and may include either a specific volume serial number in the VOLSER 410 field or all blanks in the VOLSER 410 field to indicate that the next available free virtual volume 200 is to be selected. Since this is a mount request for a new volume, the fields: start block ID 430, block count 440 and block size 450 may not be used and may include blanks or zeroes. The mount request is passed through the virtual tape device 20 to the storage manager 60, in one approach. The storage manager 60 then instructs the virtual volume handler 30 to create the virtual volume 200 in the tape volume cache 50. The virtual volume handler 30 writes a volume header 210 which includes the volume ID 212, a volume length 214 of zero, since this is a new volume, and in accordance with the present embodiment, the partial volume flag 218 may be set to "OFF." The storage manager 60 may also create/update its virtual volume database 68 with information about the virtual volume 200 being mounted, updating it cache resident type 520 to "Resident" indicating that it is only in the tape volume cache 50. Once the virtual volume 200 has been created in the tape volume cache 50, the virtual tape device 20 the mount request was received on indicates to the host system 10 that the mount is complete and that the application can begin to write data to that virtual tape device 20, in one embodiment.

In some embodiments, the hierarchical storage application running on a host system 10 now may migrate one or more host data files to the VTS system 100 by writing data to the virtual tape device 20. As each host data block is written, the data block, typically 16 KB (but not limited to 16 KB, for example, 8 KB, 32 KB, 64 KB, etc.), is compressed by the virtual tape device 20 and passed to the virtual volume handler 30. The virtual volume handler 30 may build a host data record 220 (FIG. 4) which includes the incrementing block ID 222, record length 224, and the compressed host record 226, in one approach. The host data record 220 may then be appended to the virtual volume 200 associated with the virtual tape device 20 the application is using. The hierarchical storage application will continue to write data blocks until either the virtual volume 200 has reached its capacity or there are no more host data files to migrate. In either case, the host system 10 will instruct the VTS system 100 to demount the virtual volume 200 through the virtual tape device 20. As each host data block is written, the virtual volume handler 30 may determine the compression achieved for each block and keep a running total for the virtual volume 200, in one approach.

According to some approaches, the demount request may be passed through the virtual tape device 20 to the storage manager 60. The storage manager 60 may instruct the virtual volume handler 30 to close the virtual volume 200 in the tape volume cache 50. It may also update its virtual volume database 68 to update the compression ratio field 570 using the information kept by the virtual volume handler 30, in one approach. It may also update the last access/data time field 560 in the virtual volume database 68. As part of closing the virtual volume 200 in the tape volume cache 50, the virtual volume handler 30 may update the volume header 210 to include some information, such as the overall length of the volume in volume length 214, in one embodiment.

Locating Host Data Records on a Physical Stacked Volume

In physical tape drives, one of the key functions is the ability to do a high speed locate operation to the beginning of the data to be read. This allows the tape drive to position to the requested data much faster than by just using conventional forward space block and read commands. This functionality also aids in performing recall operations.

Previous VTS systems that employ hierarchical storage are inefficient in handling recall operations since they recall an entire logical volume from the physical tape into cache before allowing the application that requested the recall to access the logical volume's data and the serialization of the operation. This is due, at least in part, to the VTS system not knowing which portion of a logical volume is requested by the application. The use of larger logical volumes, e.g., 4 GB and greater, further increases this inefficiency, as the time required to move the data from the tape to cache increases substantially with larger logical volume sizes.

This leads to an inefficiency in that the amount of data that is copied from physical tape back into cache is generally far greater than the amount of data actually requested to be read by the host application. One other aspect of previous VTS systems that is problematic is that the tape volumes that the applications are aware of are a logical construct and there is not a one-to-one relationship between the tape volumes and a physical tape to which they are copied. Many logical volumes are 'stacked' end-to-end on a physical tape volume to maximize the utilization of the physical media. This means that the positioning information that an application maintains for the location of a given dataset has no direct relationship to the location of the data on the underlying physical tape media. Also, the host written tape records are optionally compressed causing further variation in actual data locations on the physical tape. During a recall operation, if the tape drive over shoots the desired volume when fast forwarding to an approximated volume location on the tape, the drive must "backhitch" by stopping the tape, rewinding the tape, and then reversing again to read the tape at a point that the drive assumes is prior to the start of the desired volume. Of course, if this position on the tape is not prior to the desired volume, the process must be repeated. Meanwhile, the user that requested the data must wait for these actions to transpire before any data can be viewed, accessed, etc.

The foregoing problems may be solved with an advance in the art, which is described herein in various embodiments, including a system for partial recall of a virtual volume. The system, in one embodiment, includes a VTS system (such as VTS system 100 in FIG. 1C) supporting at least one virtual volume that is accessed through at least one virtual tape device. The VTS system also supports at least two levels of hierarchical storage, at least one level being random access storage, such as a disk-based storage system, and one level being sequential access storage, such as a physical tape drive and media. The storage capacity of each may be such that the physical tape storage is many times the capacity of the random access storage. The VTS system preferably employs data compression to reduce the amount of space required to store the data contained in a virtual and/or physical tape volume, in preferred embodiments. Data records of a fixed size written by the host system may be compressed resulting in smaller host data records stored on a virtual volume. The size of each resulting smaller host data record is dependent on the compressibility of the data of each host data record. The VTS system also places a plurality of virtual volumes on physical tape media and may copy virtual volume data between random access storage and physical tape. Pluralities of compressed host data records for a virtual volume may be combined to create larger fixed size data blocks written to physical tape media. The random access storage serves as a cache for virtual volumes and is referred to as a "tape volume cache." All host system access to the data contained in a virtual volume is through the tape volume cache, in preferred approaches. Additionally, the processor may maintain data attributes bound to the logical volume to be used in the location and management of the virtual volume's data.

In one embodiment, the VTS system comprises a processor configured to allow a host system to access a subset of the data associated with a logical volume, with the proviso that all of the logical volume's data is not copied into the tape volume cache from its location on physical media, in one embodiment. The host system may provide information to the processor, such that the processor may retrieve only the portion of the logical volume requested from physical media and configures the retrieved data in its tape volume cache such that the essential structure of a virtual volume remains so that, to the host system and its application programs, it appears that the system is accessing the whole virtual volume, and not just a subset of the data in a partial virtual volume.

In another embodiment, the information host system provides the processor regarding the portion of a virtual volume for which access is desired is the starting logical block identifier (SLBID) relative to the beginning of the virtual volume, the number of host data records to be accessed, and the size of the uncompressed host data records, in some embodiments. The processor uses the SLBID, the retained compression ratio for the virtual volume and the uncompressed size of the host data records to then determine the PBID of the physical block written to physical media that contains the starting host data record. The processor also uses the number of host data records information to determine at least the minimum number of physical data blocks to retrieve to ensure all of the host system requested data is available in the tape volume cache, in one approach.

In some embodiments, a mount command issued to the VTS system may be modified to provide additional information about the requested data. In addition to the logical volume the data resides on, the application may provide the logical block location of the beginning of the dataset/object that is requested, the number of data records that make up that dataset/object, and/or the uncompressed size of the data records. Since the data written to magnetic tape is in a packed structure, in some approaches, meaning that multiple host records are aggregated into a single 256 KB record (or some other size, such as 128 KB, 512 KB, 1024 KB, etc.) that is written to the magnetic tape, a method with which the physical block identification number (PBID) of the physical block can be found that contains the beginning of the requested dataset/object from the application would speed the data recall. To satisfy this need, in one embodiment, the application requesting the data may provide the uncompressed size of the records and the starting logical block ID (SLBID) for the requested data, with the VTS system using the overall compression ratio for the data written to the logical volume the last time it was written to in determining the physical block ID (PBID) on the magnetic tape that points to the location on the logical volume that the requested dataset resides to more efficiently find the requested dataset on the magnetic tape.

According to one illustrative embodiment, presented by way of example only with illustrative values that may be different in a variety of implementations and with reference to FIGS. 2, 6, and 7, each logical volume data record 310 may be comprised of a virtual volume VOLSER 312 field, a virtual volume start block ID 314, and virtual volume data 316 which is comprised of host data records 220. The virtual volume VOLSER 312 and virtual volume start block ID 314 fields may be part of a 360 byte area at the beginning of each logical volume data record 310. The logical volume data record 310 is written as a physical block and may be 256 KB in length (261,784 bytes), except for the last record, since in one embodiment, a logical volume's data does not span a physical block. In some embodiments, a host data record (typically a very large data record) may span across two or more physical blocks. Of course, the lengths (number of bytes) of each of these fields may be different than that described above, and each physical block and/or host record may have more or less fields than are described above.

To better illustrate the embodiments and methods disclosed herein, some examples are presented. In these examples, some assumptions are made, including a host uncompressed data record size of about 32,760 bytes, an over compression ratio of about 3:1, that the PBID that the logical volume ABC123 begins at is 1000, that the SLBID for the requested dataset is 1500, and that the size of the dataset (uncompressed) is about 48 KB.

To determine the PBID for the requested data on the logical volume, and ultimately access the requested data from the logical volume on the magnetic tape medium, the following steps may be followed, in one approach.

According to one embodiment, the number of host compressed data records per physical block is determined according to a formula, e.g., (physical block size−header size)/(uncompressed size of the host data records/compression ratio for the volume). According to one example, based on the assumptions made above, the number of logical host data records per physical block is (261,784 bytes−360 bytes)/(32760 bytes)/3=23.93.

Then, the PBID of the physical block that contains the requested host data records is determined in a next approach. This may be accomplished by following this equation: (dataset SLBID/number of host compressed data records per physical block)+starting PBID for the logical volume. Based on the example data, this would equal (1500/23.95)+1000=1062.68.

Further, since the PBID result is not a whole number, the requested dataset does not start at the exact beginning of the physical block (data record) on the physical media, so in one approach, the result is rounded down to ensure that reading of the physical medium (such as a magnetic tape) begins before the anticipated starting point of the requested dataset. In practice, because the compression ratio can vary over a logical volume's data blocks and because it is better to position the physical medium to a position that corresponds to a physical block located before the actual requested data, due to the characteristics of typical physical media, such as a magnetic tape drive, like the IBM 3592, the result of the calculation is rounded down to the nearest physical block ending in 1 or 10 to better position the physical medium in a position preceding the requested dataset. So, for this example, it is rounded down to the nearest 10, so the physical media drive is instructed to locate to PBID 1060, in order to provide access to the dataset residing in the physical block corresponding to PBID 1062.

Once the physical medium is positioned close to the requested physical block, enough physical blocks are read into the tape volume cache to ensure the requested data is obtained. This could be done a couple of ways, as are described in detail below.

According to one embodiment, the first physical block is read to the tape volume cache, and it is examined for the logical block ID corresponding to the requested dataset. If the physical block includes the logical block ID, then processing is complete since the proper physical block has been copied to the tape volume cache. If the logical block ID corresponding to the requested dataset is not in the read physical block, a more accurate position is determined and the physical medium is repositioned to this new position estimate (either forward or backward). The more accurate position is determined such that enough physical blocks are read to ensure that the requested host data record corresponding to the logical block ID is read into the tape volume cache.

In another embodiment, a predetermined size of data records, enough to account for the variability of the compression ratio, e.g., 2 MB, 5 MB, 10 MB, 20 MB, etc., are read into the tape volume cache. Of course, in some embodiments, a number of data records may be read into cache instead of a size of data records. Then, the requested logical block ID is found that corresponds to the requested dataset. Since reading the data off a physical medium, even a few MB, takes just a fraction of a second or so (modern tape drives are capable of reading data at a rate greater than 100 MB/sec), this embodiment is likely to be the more efficient of the two disclosed methods. Having to reposition the physical medium, such as a magnetic tape using a magnetic tape drive, can take a few seconds, so if the physical medium is not positioned in a position preceding the requested dataset, time is lost. With this embodiment, the only pieces of information that are stored in the database in the VTS system for a logical volume is the last overall compression ratio and the PBID that the logical volume begins at on the physical medium. All the other information that is used to perform the calculation may be provided by the host system at the time the dataset/object is requested.

Figure 10:
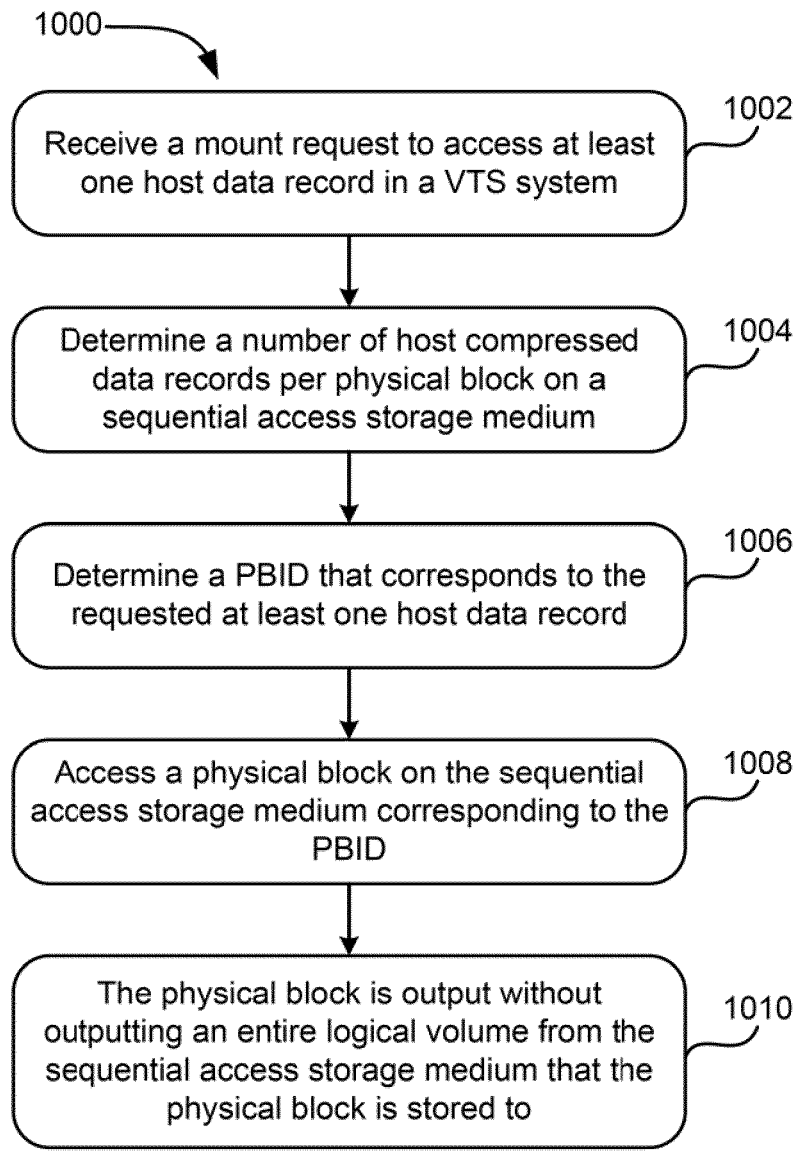
FIG. 10 is a flow diagram of a method, according to one embodiment.

Referring to FIG. 10, a method 1000 for accessing data stored on a virtual tape storage (VTS) system is shown, according to one embodiment. The method 1000 may be carried out in any desired environment, including those described herein, and may include embodiments and/or approaches described herein. Also, the method 1000 may include more operations than those described below, as would be known to one of skill in the art.

In operation 1002, a mount request is received to access at least one host data record in a virtual tape storage (VTS) system. In one approach, the mount request may include information that allows the VTS system to determine the physical block having the requested host data record, such as the logical block ID (LBID) and uncompressed size of the requested host data record(s).

In operation 1004, a number of host compressed data records per physical block on a sequential access storage medium is determined. In one embodiment, the number of host compressed data records per physical block may be determined according to a formula, $((A-B)*C)/D$, wherein A is a physical block size on the sequential access storage medium in bytes, B is a header size of a physical block on the sequential access storage medium in bytes, C is a compression ratio for the logical volume on the sequential access storage medium, and D is an uncompressed size of the requested host data record(s).

In operation 1006, a physical block ID (PBID) that corresponds to the requested host data record(s) is determined. In one embodiment, the PBID that corresponds to the requested host data record(s) is determined according to a formula, (E/F)+G, wherein E is a starting logical block ID (SLBID) for the requested host data record(s), F is the number of host compressed data records per physical block, and G is a starting PBID for a logical volume in which the requested host data record(s) is stored.

In some embodiments, the PBID calculated in operation 1006 may be rounded down to the nearest 1, the nearest 10, the nearest 20, the nearest 50, etc., such that it is ensured that the requested host data record(s) is accessed in a first reading of the sequential storage medium. For example, if the calculated PBID is 1065.45, the PBID may be rounded down to 1065, 1060, 1050, etc.

In operation 1008, a physical block on the sequential access storage medium corresponding to the PBID is accessed. In one embodiment, accessing a physical block on the sequential access storage medium corresponding to the PBID may comprise reading into a tape volume cache a first physical block, and examining the first physical block in the tape volume cache to determine if the requested host data record(s) is present in the tape volume cache. Additionally, in a further approach, a new position to position the sequential access storage medium may be determined based on the first physical block and a second physical block including the requested host data record(s) may be read into the tape volume cache.

In operation 1010, the physical block is output without outputting an entire logical volume from the sequential access storage medium that the physical block is stored to.

In one embodiment, the sequential access storage medium comprises at least one magnetic tape medium. Along with this, at least one magnetic tape drive may be provided to access the magnetic tape medium, the magnetic tape medium possibly being housed in a magnetic tape cartridge.

In another embodiment, accessing a physical block on the sequential access storage medium corresponding to the PBID may comprise reading into a tape volume cache at least a predetermined memory size of physical blocks, locating a PBID corresponding to the requested host data record(s) in the physical blocks, and accessing the physical block that corresponds to the PBID. In some approaches, the predetermined memory size may be 1 MB, 2 MB, 5 MB, 10 MB, etc. In alternate approaches, a number of host data records may be read instead of a size of host data records.

According to one embodiment, a last overall compression ratio may be stored by the VTS system for each logical volume stored to the sequential access storage medium. This ratio may be used in some of the calculations in order to determine a location of a physical block on the sequential access storage medium.

A computer program product, in one embodiment, comprises a computer readable storage medium having computer readable program code embodied therewith. The computer readable program code comprises computer readable program code configured to receive a mount request to access at least one host data record on a virtual tape storage (VTS) system, computer readable program code configured to determine a number of host compressed data records per physical block on a magnetic tape medium, computer readable program code configured to determine a physical block ID (PBID) that corresponds to the requested at least one host data record, computer readable program code configured to access a physical block on the magnetic tape medium corresponding to the PBID, and computer readable program code configured to output the physical block without outputting an entire logical volume from the magnetic tape medium that the physical block is stored to.

In some embodiments, the computer program product may further include computer readable program code configured to determine a number of host compressed data records per physical block according to a formula, ((A−B)*C)/D, wherein A is a physical block size on the magnetic tape medium in bytes, B is a header size of a physical block on the magnetic tape medium in bytes, C is a compression ratio for the logical volume on the magnetic tape medium, and D is an uncompressed size of the requested at least one host data record.

In more approaches, the computer program product may further comprise computer readable program code configured to determine a physical block ID (PBID) that corresponds to the requested at least one host data record according to a formula, (E/F)+G, wherein E is a starting logical block ID (SLBID) for the requested at least one host data record, F is the number of host compressed data records per physical block, and G is a starting PBID for a logical volume in which the requested at least one host data record is stored.

Additionally, the computer program product may further comprise computer readable program code configured to round down the PBID calculated to the nearest 1, the nearest 10, the nearest 50, the nearest 100, etc.

In one approach, the computer readable program code configured to access a physical block on the magnetic tape medium corresponding to the PBID may comprise computer readable program code configured to read into a tape volume cache a first physical block and computer readable program code configured to examine the first physical block in the tape volume cache to determine if the requested at least one host data record is present in the tape volume cache.

In another approach, the computer program product may include computer readable program code configured to determine a new magnetic tape position based on the first physical block and computer readable program code configured to read into a tape volume cache a second physical block including the requested at least one host data record.

According to one approach, the computer readable program code configured to access a physical block on the magnetic tape medium corresponding to the PBID may comprise computer readable program code configured to read into a tape volume cache a predetermined memory size of physical blocks, computer readable program code configured to locate a logical block ID (LBID) corresponding to the requested at least one host data record in the physical blocks, and computer readable program code configured to access a host data record that corresponds to the LBID. In some approaches, the predetermined memory size may be 1 MB, 2 MB, 5 MB, 10 MB, etc. In alternate approaches, a number of host data records may be read instead of a size of host data records.

According to one embodiment, a last overall compression ratio may be stored by the VTS system for each logical volume stored to the magnetic tape medium. This ratio may be used in some of the calculations in order to determine a location of a physical block on the magnetic tape medium.

A virtual tape storage (VTS) system, in one embodiment, comprises random access storage, sequential access storage, support for at least one virtual volume, a storage manager having logic for determining a physical block ID (PBID) that corresponds to a starting logical block ID (SLBID), logic for receiving a mount request to access at least one host data record stored to the sequential access storage, logic for determining a number of host compressed data records per physical block on the sequential access storage, logic for determining a physical block ID (PBID) that corresponds to the requested at least one host data record, and logic for accessing a physical block on the sequential access storage corresponding to the PBID, which includes reading into a tape volume cache a first physical block, and examining the first physical block in the tape volume cache to determine if the requested at least one host data record is present in the tape volume cache; or reading into a tape volume cache at least a predetermined memory size of physical blocks, locating a logical block ID (LBID) corresponding to the requested at least one host data record in the physical blocks, and accessing a host data record that corresponds to the SLBID. The VTS system also includes logic for copying a portion of a logical volume from the sequential access storage to the random access storage without copying the entire logical volume and logic for storing a last overall compression ratio for each logical volume stored to the sequential access storage, wherein the sequential access storage comprises at least one magnetic tape medium.

In one approach, the logic for determining a number of host compressed data records per physical block may comprise solving a formula, $((A-B)*C)/D$, wherein A is a physical block size on the sequential access storage medium in bytes, B is a header size of a physical block on the sequential access storage medium in bytes, C is a compression ratio for the logical volume on the sequential access storage medium, and D is an uncompressed size of the requested at least one host data record.

In another approach, the logic for determining a PBID that corresponds to the requested at least one host data record may comprise solving a formula, $(E/F)+G$, wherein E is a starting logical block ID (SLBID) for the requested at least one host data record, F is the number of host compressed data records per physical block, and G is a starting PBID for a logical volume in which the requested at least one host data record is stored.

Also, in some embodiments, the PBID calculated may be rounded down to the nearest 1, 10, 20, 50, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, comprising:
   a non-transitory computer readable storage medium having computer readable program code embodied therewith, the computer readable program code comprising:
   computer readable program code configured to receive a mount request to access at least one host data record on a virtual tape storage (VTS) system;
   computer readable program code configured to determine a number of host compressed data records per physical block on a magnetic tape medium by calculating a result of a formula, $((A-B)*C)/D$, wherein A is a physical block size on the magnetic tape medium in bytes, B is a header size of a physical block on the magnetic tape medium in bytes, C is a compression ratio for the logical volume on the magnetic tape medium, and D is an uncompressed size of the requested at least one host data record;
   computer readable program code configured to determine a physical block ID (PBID) that corresponds to the requested at least one host data record;
   computer readable program code configured to access a physical block on the magnetic tape medium corresponding to the PBID; and
   computer readable program code configured to output the physical block without outputting an entire logical volume from the magnetic tape medium that the physical block is stored to.

2. The computer program product as recited in claim 1, wherein the computer readable program code configured to access a physical block on the magnetic tape medium corresponding to the PBID comprises:
   computer readable program code configured to read into a tape volume cache a predetermined number of physical blocks;
   computer readable program code configured to locate a logical block ID (LBID) corresponding to the requested at least one host data record in the physical blocks; and
   computer readable program code configured to access a host data record that corresponds to the LBID.

3. The computer program product as recited in claim 1, further comprising computer readable program code configured to determine a physical block ID (PBID) that corresponds to the requested at least one host data record by calculating a result of a formula, $(E/F)+G$, wherein E is a starting logical block ID (SLBID) for the requested at least one host data record, F is the number of host compressed data records per physical block, and G is a starting PBID for a logical volume in which the requested at least one host data record is stored.

4. The computer program product as recited in claim 3, further comprising computer readable program code configured to round down the PBID calculated to the nearest 1.

5. The computer program product as recited in claim 3, further comprising computer readable program code configured to round down the PBID calculated to the nearest 10.

6. The computer program product as recited in claim 1, wherein the computer readable program code configured to access a physical block on the magnetic tape medium corresponding to the PBID comprises:
   computer readable program code configured to read into a tape volume cache a first physical block; and
   computer readable program code configured to examine the first physical block in the tape volume cache to determine if the requested at least one host data record is present in the tape volume cache.

7. The computer program product as recited in claim 6, further comprising:
   computer readable program code configured to determine a new magnetic tape position based on the first physical block; and
   computer readable program code configured to read into a tape volume cache a second physical block including the requested at least one host data record.

8. The computer program product as recited in claim 1, wherein the computer readable program code configured to access a physical block on the magnetic tape medium corresponding to the PBID comprises:
   computer readable program code configured to read into a tape volume cache a predetermined memory size of physical blocks;
   computer readable program code configured to locate a logical block ID (LBID) corresponding to the requested at least one host data record in the physical blocks; and computer readable program code configured to access a host data record that corresponds to the LBID.

9. The computer program product as recited in claim 8, wherein the predetermined memory size is 2 MB.

10. The computer program product as recited in claim 1, wherein a last overall compression ratio is stored by the VTS system for each logical volume stored to the magnetic tape medium.

11. A virtual tape storage (VTS) system, comprising:
random access storage;
sequential access storage;
support for at least one virtual volume;
a storage manager having logic for determining a physical block ID (PBID) that corresponds to a starting logical block ID (SLBID);
logic for receiving a mount request to access at least one host data record stored to the sequential access storage;
logic for determining a number of host compressed data records per physical block on the sequential access storage by solving a formula, $((A-B)*C)/D$, wherein A is a physical block size on the sequential access storage medium in bytes, B is a header size of a physical block on the sequential access storage medium in bytes, C is a compression ratio for the logical volume on the sequential access storage medium, and D is an uncompressed size of the requested at least one host data record;
logic for determining a physical block ID (PBID) that corresponds to the requested at least one host data record;
logic for accessing a physical block on the sequential access storage corresponding to the PBID, comprising:
reading into a tape volume cache a first physical block, and examining the first physical block in the tape volume cache to determine if the requested at least one host data record is present in the tape volume cache; or
reading into a tape volume cache at least a predetermined memory size or a predetermined number of physical blocks, locating a starting logical block ID (SLBID) corresponding to the requested at least one host data record in the physical blocks, and accessing a host data record that corresponds to the SLBID;
logic for copying a portion of a logical volume from the sequential access storage to the random access storage without copying the entire logical volume; and
logic for storing a last overall compression ratio for each logical volume stored to the sequential access storage medium,
wherein the sequential access storage comprises at least one magnetic tape medium.

12. The VTS system as recited in claim 11, wherein the predetermined memory size 2 MB, and wherein the predetermined number of physical blocks to read into the tape volume cache is based on a minimum number of physical data blocks that ensures that all of the host system requested data is available in the tape volume cache.

13. The VTS system as recited in claim 11, wherein the logic for determining a PBID that corresponds to the requested at least one host data record comprises solving a formula, $(E/F)+G$, wherein E is a starting logical block ID (SLBID) for the requested at least one host data record, F is the number of host compressed data records per physical block, and G is a starting PBID for a logical volume in which the requested at least one host data record is stored.

14. The VTS system as recited in claim 13, further comprising rounding down the PBID calculated to the nearest 1 or 10.

15. A computer program product, comprising a non-transitory computer readable storage medium having computer readable program code embodied therewith, the computer readable program code comprising:
computer readable program code configured to receive a mount request to access at least one host data record on a virtual tape storage (VTS) system;
computer readable program code configured to determine a number of host compressed data records per physical block on a magnetic tape medium by calculating a result of a formula, $((A-B)*C)/D$, wherein A is a physical block size on the magnetic tape medium in bytes, B is a header size of a physical block on the magnetic tape medium in bytes, C is a compression ratio for the logical volume on the magnetic tape medium, and D is an uncompressed size of the requested at least one host data record;
computer readable program code configured to determine a physical block ID (PBID) that corresponds to the requested at least one host data record;
computer readable program code configured to access a physical block on the magnetic tape medium corresponding to the PBID;
computer readable program code configured to output the physical block without outputting an entire logical volume from the magnetic tape medium that the physical block is stored to; and
computer readable program code configured to store a last overall compression ratio for each logical volume stored to the magnetic tape medium.

16. The computer program product as recited in claim 15, further comprising computer readable program code configured to determine a physical block ID (PBID) that corresponds to the requested at least one host data record by calculating a result of a formula, $(E/F)+G$, wherein E is a starting logical block ID (SLBID) for the requested at least one host data record, F is the number of host compressed data records per physical block, and G is a starting PBID for a logical volume in which the requested at least one host data record is stored.

17. The computer program product as recited in claim 16, further comprising computer readable program code configured to round down the PBID calculated to the nearest 1 or 10.

18. The computer program product as recited in claim 15, wherein the computer readable program code configured to access a physical block on the magnetic tape medium corresponding to the PBID comprises:
computer readable program code configured to read into a tape volume cache a first physical block; and
computer readable program code configured to examine the first physical block in the tape volume cache to determine if the requested at least one host data record is present in the tape volume cache.

19. The computer program product as recited in claim 18, further comprising:
computer readable program code configured to determine a new magnetic tape position based on the first physical block; and
computer readable program code configured to read into a tape volume cache a second physical block including the requested at least one host data record.

20. The computer program product as recited in claim 15, wherein the computer readable program code configured to access a physical block on the magnetic tape medium corresponding to the PBID comprises:

computer readable program code configured to read into a tape volume cache a predetermined memory size of physical blocks;

computer readable program code configured to locate a logical block ID (LBID) corresponding to the requested at least one host data record in the physical blocks; and computer readable program code configured to access a host data record that corresponds to the LBID.

* * * * *